April 4, 1950  H. P. STEWART  2,502,680
LETTER SCALE
Filed July 7, 1945

INVENTOR.
HENRY P. STEWART
BY
ATTORNEY

Patented Apr. 4, 1950

2,502,680

UNITED STATES PATENT OFFICE 2,502,680

LETTER SCALE

Henry P. Stewart, New York, N. Y.

Application July 7, 1945, Serial No. 603,634

5 Claims. (Cl. 265—53)

This invention relates to new and useful improvements in a combination letter scale and writing instrument.

The object of the present invention is to provide a simple adjustment or attachment for the customary fountain pen, pencil or similar writing instrument to permit its use also as a scale for weighing letters, packages or other light objects.

With this object in view I provided a movable fulcrum which may be readily attached to or detached from the clip normally provided near one end of such writing instruments. Calibrations, e. g. in ounces, are applied to the barrel or cap of the writing instrument along the clip whereby the weight of the object can be easily read by positioning the fulcrum.

The object to be weighed is fastened to the end of the working instrument near the clip, preferably by means of a screw having a knurled head.

In order to increase the range of the scale, according to one feature of the invention, means are provided adjacent to the writing end of the instrument to hold in place a predetermined weight, e. g., a coin. Additional calibrations may be provided in alignment with the clip for reading off heavier weights when the working end of the instrument is thus weighted.

These and other features of the invention will more clearly appear from the following description of the two embodiments thereof and the appended claims.

Figure 1:
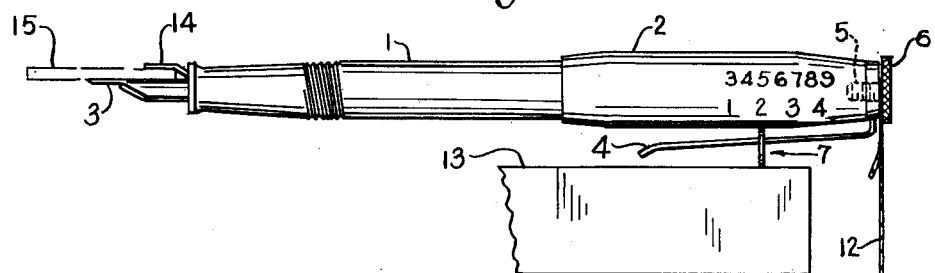
Fig. 1 is a side elevation of an embodiment of the invention as applied to a fountain pen.
Figure 2:
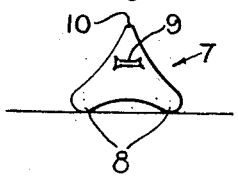
Fig. 2 is a top plan view of the movable fulcrum.

Referring to Fig. 1, 1 is the barrel and 2 the customary cap of a fountain pen whose working end or pen nib is indicated at 3. The cap 2 is provided with the usual clip 4 having a resilient leg extending parallel with the side of the cap, and by means of which the pen can be fastened to the pocket of the user. The clip 4 is fastened to the free end of the cap 2 by any suitable means through which projects a screw 5 having a knurled head 6. Calibrations indicating ounces are engraved on the cap in alignment with the clip 4.

The fulcrum consists of a substantially triangular piece of metal, fibre, or the like 7, having two legs 8, by means of which it may rest on a flat surface, and a slit or opening 9 through which the resilient leg of the clip 4 may be pushed. On account of the resiliency of the fulcrum 7 and the clip 4, the fulcrum will be held in place with its point 10 resting against the side of the cap 2 and indicating the weight of the object.

In order to weigh a package, letter or the like, indicated at 11, this is clamped to a free end of the cap 2 by loosening and then again tightening the screw 5. A thin article like a letter may be clamped between the knurled head 6 and the top of the cap 2. A bulkier article such as a package may be fastened to the screw 5 by means of a string 12 clamped between the cap 2 and the head 6 of the screw.

The pen 1 is then placed on top of a horizontal surface 13, such as a table top, with the forked ends 8 of the fulcrum 7 resting thereon and the package or letter 11 hanging freely beyond the edge of the table 13. The fulcrum 7 is then pushed to the left or the right on clip 4 until the article 11 balances the pen on the fulcrum. The numeral aligned with point 10 of fulcrum 7 will indicate the weight of the article in ounces.

In order to permit the weighing of heavier articles, means such as a resilient clamp 14 is provided adjacent the writing end 3. A coin 15, e. g., a fifty-cent piece, may be clamped between 14 and the nib 3, increasing the weight on the free end of the weighing scale. The row of numerals 1, 2, 3, 4 on the cap 2 indicates, in ounces, the weight when coin 15 is not used, and the row of numerals 3 to 9 indicates, in ounces, the weight when the coin 15 is put under the clamp 14.

Figure 3:
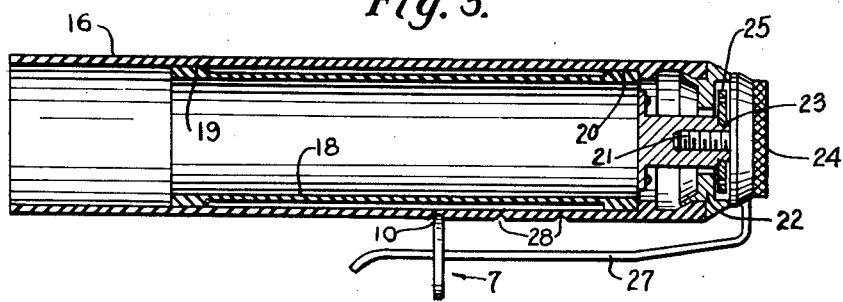
Fig. 3 is a longitudinal cross-section and Fig. 4 a side elevation of a modification of the invention.
Figure 4:
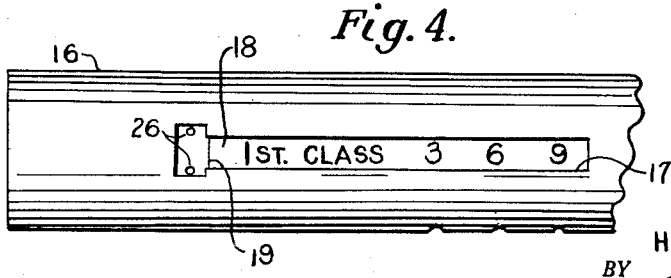

Instead of printing or engraving the calibrations on the cap 2, it may be placed on a rotatable cylinder provided within the cap and visible through a longitudinal slit in the cap. Such modification is illustrated in Figs. 3 and 4. A cap is provided with a longitudinal slit 17 through which calibrations appearing on a drum 18 may be read. The calibrations may indicate, for instance, weights in ounces and the postage in pennies for 1st class mail, air mail, parcel post, etc.

The drum 18 is provided with shoulders 19 and 20 at its ends which fit against the inside surface of the cap 16. A stud 21 is attached to one end of the drum 18 and projects through a bushing 22 closing the end of cap 16 and carrying clip 27. The fulcrum 7 which is slidable on the leg of clip 27 engages with its point 10 indentations 28 in the cap 16 so as to insure proper positioning with respect to the calibrations appearing through slit 17.

The drum 18 may be rotated to display the desired calibration by inserting a pointed instrument in one of the holes 26 through an enlargement in the slit 17. A nut 25 is provided on screw 23 to prevent loosening of the clamp formed by bushing 22 and knurled head 24 when the drum 18 is rotated.

Figure 5:
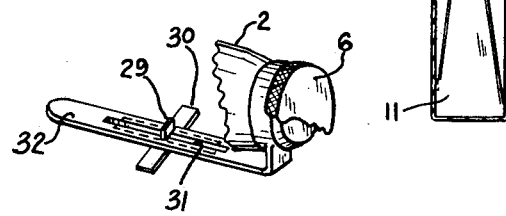
Fig. 5 represents a perspective view of a modified clip and fulcrum.

Fig. 5 shows a clip in which the base of the fulcrum can be adjusted so as not to project from the clip when the pen or pencil is not used as a weighing instrument.

The fulcrum proper consists of a pointed pivot button 29, pressing against the cap of the pen or the pencil in a manner similar to that of fulcrum 10 in Fig. 3. Button 29 is soldered or riveted to a base strip 30 through slot 31 in clip 32. By sliding button 29 along slot 31, the fulcrum can be adjusted for any desired weighing position. By turning base plate 30 from inoperative position, shown in dotted lines, into the full-drawn position, pivot button 29 and base strip 30 are made ready for a weighing operation and can be placed on a table in a manner as shown in Fig. 1. If the pen or pencil to which the clip is attached is not to be used as a weighing instrument, base strip 30 is turned around about an angle of 90° so that it lies flat against the outer surface of clip 32. In this condition of the clip, the pen or pencil looks like an ordinary pen or pencil and can be used as such without any interference from projecting parts.

It will be obvious to those skilled in the art that many other modifications may be practiced so as to adapt the invention to various types of writing instruments such as fountain pens, screw pencils and the like, the three embodiments herein illustrated being given merely as exemplifications.

What I claim is:

1. In an instrument of the kind described, a working end and a free end for the instrument, a clip, a resilient leg of the clip extending towards the working end and fastened to the instrument near its free end, a movable fulcrum clamped between said leg and the body of the instrument and on which the instrument is pivoted when placed on a horizontal surface, there being calibrations on the instrument for alignment with the fulcrum, and means for attaching articles to be weighed to the free end of the instrument.

2. The instrument according to claim 1, wherein the resilient leg of the clip has a slot parallel to the extension of the leg, and wherein the fulcrum consists of a pivot member arranged on the inner surface of the leg and a base member arranged on the outer surface of the leg and shaped to conform with said outer surface, said pivot member and base member being attached to each other through the slot so as to permit movement of the pivot member along the slot and rotation of the base member into a position perpendicular to the extension of the leg.

3. In a device of the kind described, an elongated member, a resilient clip fastened to one end of the member and extending along the member and spaced therefrom, a movable fulcrum frictionally held between said member and clip, and arranged to pivot the member on a horizontal surface, calibrations on the member with which the fulcrum may be aligned, and means for attaching articles to be weighed to one end of the member.

4. In a device of the kind described, an elongated member, a clip comprising a leg extending along the member and fastened to one end of the member, a fulcrum movably attached to said leg of the clip and arranged to pivot the member on a horizontal surface, calibrations on the member for alignment with the fulcrum, and means for attaching articles to be weighed to one end of the member.

5. A portable weighing device comprising an elongated member, a pocket clip attached to one end of said member and having a portion parallel to said member, means for attaching articles to be weighed to said one end, and a fulcrum having two prongs and a bridge connecting said prongs and said bridge frictionally held between said clip and said member.

HENRY P. STEWART.

REFERENCES CITED

The following references are of record in the file of this patent:

UNITED STATES PATENTS

| Number | Name | Date |
|---|---|---|
| 2,157,807 | Westermann | May 9, 1939 |

FOREIGN PATENTS

| Number | Country | Date |
|---|---|---|
| 453,128 | Great Britain | Sept. 4, 1936 |
| 606,313 | Germany | Jan. 8, 1936 |
| 766,953 | France | Apr. 23, 1934 |